US006679294B1

United States Patent
Ringelberg et al.

(10) Patent No.: US 6,679,294 B1
(45) Date of Patent: Jan. 20, 2004

(54) CRYOGENIC FLUID SYSTEM FOR CONDUCTION OF CRYOGENIC LIQUIDS

(75) Inventors: John C. Ringelberg, Pine, CO (US); Bryan R. Helgesen, Parker, CO (US); Steven P. Sakla, Littleton, CO (US); Eric P. Vigil, Denver, CO (US); Frank C. Zegler, Idledale, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/152,906

(22) Filed: May 22, 2002

Related U.S. Application Data
(60) Provisional application No. 60/292,861, filed on May 22, 2001.

(51) Int. Cl.$^7$ .................................................. F16L 9/18
(52) U.S. Cl. ........................ 138/114; 138/126; 138/125; 138/149; 138/137; 62/50.7
(58) Field of Search ................. 138/123–126, 138/137, 140, 149, 114; 62/50.7

(56) References Cited

U.S. PATENT DOCUMENTS

| | | | | |
|---|---|---|---|---|
| 3,911,961 A | * | 10/1975 | Peyton et al. ................ | 138/113 |
| 3,941,546 A | * | 3/1976 | Hartig ......................... | 425/526 |
| 4,044,184 A | * | 8/1977 | Ashida et al. ............... | 428/113 |
| 4,126,659 A | * | 11/1978 | Blad ........................... | 264/573 |
| 4,181,157 A | * | 1/1980 | DeCamp ..................... | 138/126 |
| 4,233,816 A | | 11/1980 | Hensley ........................ | 62/55 |
| 4,298,416 A | * | 11/1981 | Casson et al. ................ | 156/87 |
| 4,303,105 A | | 12/1981 | Rohner ....................... | 138/149 |
| 4,492,089 A | | 1/1985 | Rohner et al. ................ | 62/55 |
| 4,876,049 A | * | 10/1989 | Aoyama et al. .............. | 264/49 |
| 5,368,184 A | | 11/1994 | Fay et al. .................... | 220/562 |
| 5,400,602 A | | 3/1995 | Chang et al. ................ | 62/50.7 |
| 5,561,983 A | | 10/1996 | Remes et al. ................ | 62/48.1 |
| 6,003,561 A | | 12/1999 | Brindza et al. .............. | 62/48.1 |
| 6,012,292 A | | 1/2000 | Gulati et al. ................. | 62/50.7 |

* cited by examiner

Primary Examiner—Patrick Brinson
(74) Attorney, Agent, or Firm—Marsh Fischmann & Breyfogle LLP

(57) ABSTRACT

A cryogenic fluid system having a flexible conduit for conducting cryogenic materials and a method for fabricating such a flexible conduit is herein disclosed. The flexible conduit of the cryogenic fluid system generally includes a first tube and a second tube disposed about the first tube. The first and second tubes can be made from the same or different materials (including composites) as long as the material which makes up at least one of the first and second tubes is silicone rubber-impregnated glass cloth. The flexible conduit also generally includes a fluorocarbon polymer liner disposed against a first inner wall of the first tube, so that the first tube is positioned between the second tube and the fluorocarbon polymer liner. Some variations of the flexible conduit have an annulus between the first and second tubes which optionally is occupied, at least in part, by insulation.

32 Claims, 1 Drawing Sheet

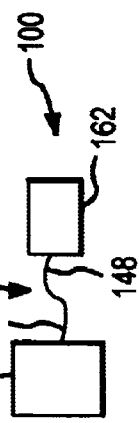
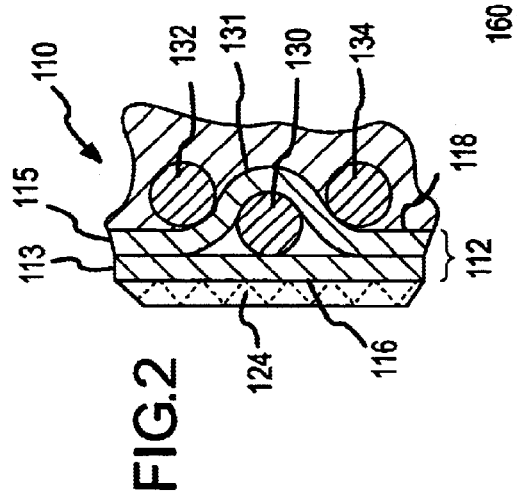
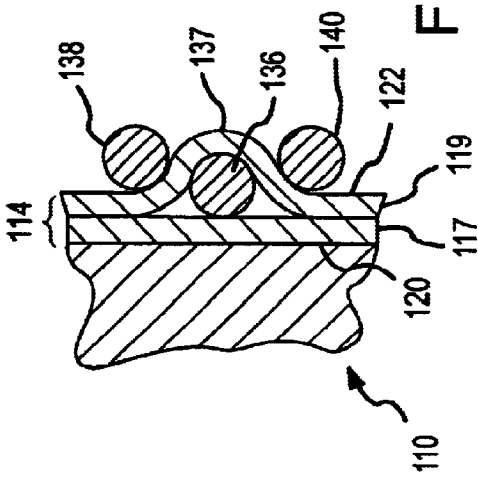
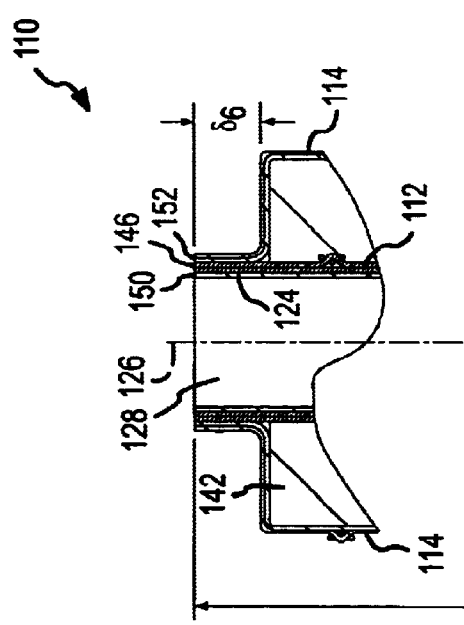

CRYOGENIC FLUID SYSTEM FOR CONDUCTION OF CRYOGENIC LIQUIDS

RELATED APPLICATION

This application claims priority under 35 USC 119(e) to U.S. Provisional Application No. 60/292,861 entitled Insulated Flexible Ducting For Cryogenic Fluid Flow filed May 22, 2001, which is incorporated herein by reference in its entirety.

FIELD OF THE INVENTION

The present invention relates in general to a method and apparatus for conduction of cryogenic liquids, and, in particular, to a cryogenic fluid system having a flexible conduit which enables transfer of cryogenic fluids with minimal leakage.

BACKGROUND OF THE INVENTION

Several attempts have been made in the past to address the need to efficiently transport cryogenic fluids using a flexible conduit. While these past attempts have provided designs that claim to achieve successful transfer of cryogenic fluids, they have demonstrated certain shortcomings. Most notably, these shortcomings relate to the lack of flexibility of the conduit and the manufacturing costs associated with producing a functional flexible conduit.

Conventional conduits for transporting cryogenic materials are generally constructed from rigid, metallic tubing incorporating costly, welded-in metal bellows which are made of a pleated metal and are ideally capable of one or more of axial, angular, lateral, and torsional movement. While these metal bellows may enable a particular conduit to lengthen/shorten, they traditionally have not however, provided for substantial flexibility (i.e. the ability to bend) throughout the substantial length of the conduit. To the contrary, most conventional cryogenic conduits have merely provided for limited flexibility in discrete locations along the length of the conduit through the use of such above-described metal bellows. While some cryogenic conduits may disclose flexibility throughout the length of the cryogenic conduit, the cost of producing such conduits eliminates the feasibility of their commercial use. Further, such conventional cryogenic conduits having metal bellows often incorporate costly (as well as rigid/inflexible) vacuum jacketing. An exemplary cryogenic conduit that includes vacuum jacketing would be arranged having an inner stainless steel tube through which the cryogenic liquid flows, an outer stainless steel tube that seals a vacuum space forming the "vacuum jacket" between the inner and outer tubes, multi-layered insulation between the tubes, and bellows interconnecting adjacent conduit tube sections to accommodate axial extension/contraction and/or flexure of the cryogenic conduit at the section(s) of the conduit which include these bellows.

In addition, adjacent segments of conventional cryogenic conduits generally are attached to one another utilizing one of two time-consuming, inflexible, and costly joint connection options: tube-in-tube connections and welded connections. A tube-in-tube connection is generally a joint device having telescoping male and female components. These tube-in-tube connections generally utilize an in-line seal placed between flanges to inflexibly join adjacent bellow-based cryogenic tubes together. Alternatively, welded connections (generally vacuum insulated) can be made between adjacent pieces of cryogenic conduit. Usually, the welded joint of the adjacent cryogenic conduits is then insulated, and a coupling is moved into place over the welded section, thus immobilizing (i.e. making rigid) that section of the cryogenic conduit.

Accordingly, it would be desirable to develop a cryogenic conduit that exhibits flexibility substantially throughout the length of the cryogenic conduit. Additionally, it would be desirable to develop a method of fabricating a cryogenic conduit that reduces the assembly time and cost of the associated welding and tooling required to assemble the cryogenic conduit.

SUMMARY OF THE INVENTION

The present invention is generally directed to a cryogenic fluid system and method of making the same. More specifically, the method and apparatus of the present invention are generally directed to a flexible tube-in-tube-type conduit that is specifically adapted for conducting cryogenic fluid. Herein the term "cryogenic fluid" generally refers to a liquid or gas (or combination of liquids and/or gases) that has temperature below (i.e., colder than) about $-100°$ F. (Fahrenheit). The cryogenic fluid system of the present invention desirably addresses the lack of conduit flexibility associated with conventional cryogenic fluid systems. Particularly desirable applications of this cryogenic fluid system are in the cooling systems of aircraft/spacecraft flight and/or ground systems. Additional application can be found in using the cryogenic fluid system of the present invention for conduction of cryogenic propellants/fuel and/or fuel components for launch vehicles, aircrafts, spacecrafts, and/or rockets. While various preferred applications of the present invention have been mentioned above, the cryogenic fluid system of the present invention may be utilized in any appropriate application for which conduction of cryogenic fluid is desired/required.

A first aspect of the present invention is embodied in a cryogenic fluid system that has a cryogenic conduit that includes a first tube made of a first composite and having an inner wall and an outer wall. The cryogenic conduit also has a second tube made of a second composite and disposed about the first tube. At least one of these first and second tubes utilizes a silicone rubber-impregnated glass cloth in its construction. A tube liner is disposed against the inner wall of the first tube, and thereby interfaces with a cryogenic fluid that may flow through the first tube. This fluid liner is made from a fluorocarbon polymer. Based upon this construction, the first tube is generally positioned between the second tube and the tube liner. In other words, the tube liner is surrounded by the first tube, which in turn is surrounded by the second tube. Herein, a "composite" refers to a construction that utilizes multiple layers and/or materials, wherein each of these layers and/or materials can be formed of the same, similar, or different substances/compositions.

Various refinements exist of the features noted in relation to the subject first aspect of the present invention as well. Further features may also be incorporated in the subject first aspect of the present invention as well. These refinements and additional features may exist individually or in any combination. For instance, the cryogenic conduit that is associated with the first aspect may be used to fluidly interconnect any appropriate components of a cryogenic fluid system. In one embodiment, a cryogenic fluid source is fluidly interconnected with one end of the cryogenic conduit, while an opposite end of the cryogenic conduit is fluidly interconnected with another component of the cryogenic system (e.g., a rocket engine, cooling jacket, or propellant storage tank). Herein, "fluidly interconnected" refers to a joining of a first component to a second component or to one or more components which may be connected with the second component, or to joining the first component to part of a system that includes the second component so that the molecules of a substance(s) (such as a liquid or gas) may be substantially confined to the system and capable of flowing through the system, including through both the first and second components.

In one embodiment of the first aspect, at least one of and more preferably both of the first composite and the second composite include silicone rubber-impregnated glass cloth as at least a part thereof. At least one of the first and second tubes may utilize a reinforcement cord in its corresponding composite construction. This reinforcement cord generally may be embedded within the first composite of the first tube and/or define at least part of the outer wall of the first tube. Reinforcement cord(s) may additionally or alternatively be embedded within the second composite of the second tube and/or define at least part of the outer wall of the second tube. Put another way, reinforcement cord(s) may be one or both "sandwiched" between layers of the respective composite material or positioned about the periphery of the first and/or second tube. Generally, each reinforcement cord may be arranged in a helical configuration about a first reference axis; accordingly, both of the first and second tubes may be generally disposed about and extend along this same first reference axis. In other words, the first reference axis may generally span along the entire annular origin of the cryogenic conduit such that any reinforcement cord utilized by the first and/or second tube spirals about the first reference axis along at least a portion of the length of the cryogenic conduit. Usually, any such reinforcement cord is made from reinforcement material such as metal wire, glass fiber-based cable/cord, polymeric-based cable/cord, and/or any combination thereof. Herein, the term "cord" can refer to and is interchangeable with one or more of "wire", "cable", "line", or the like. Moreover, the term "cord" includes wrapping a single cord in any of the above-noted manners, as well as wrapping a collection of cords in any of the above-noted manners.

The first tube of the cryogenic fluid system of the first aspect can be designed/configured to have an at least generally annular first layer of silicone rubber-impregnated glass cloth disposed in interfacing relation with the tube liner, a first reinforcement cord wrapped about the first layer, an at least generally annular second layer of silicone rubber-impregnated glass cloth disposed about the first reinforcement cord, and a second reinforcement cord disposed about the second layer. Similarly, the second tube may also be designed/configured to have an at least generally annular first layer of silicone rubber-impregnated glass cloth, a first reinforcement cord wrapped about the first layer, an at least generally annular second layer of silicone rubber-impregnated glass cloth disposed about the first reinforcement cord, and a second reinforcement cord disposed about the second layer. In one embodiment, the first and second tubes each have the above-noted configuration. In either or both instances (i.e., in relation to the first and/or second tube), the corresponding first and second reinforcement cords can be (but do not necessarily have to be) made up of the above-mentioned reinforcement materials.

One embodiment of this first aspect of the present invention generally includes an annulus between the first and second tubes. In other words, the outer wall of the first tube can be spaced from an inner wall of the second tube. Preferably, insulation is generally positioned within the annulus. This insulation preferably includes one or more of cryolite ($Na_3AlF_3$), Min-K (e.g., Santocel silica reinforced with asbestos fibre and bonded with organic resin), ceramic fiber-based insulation, and any other appropriate substance that is capable of preventing or at least generally reducing the passage of heat from the first tube to the second tube (or vice versa). In another embodiment, the inner wall of the second tube directly interfaces with the outer wall of the first tube.

As for the tube liner of this first aspect, the fluorocarbon polymer that makes up the tube liner may be generally characterized as a fluoro-ethylene polymer and/or copolymer, and more preferably is a polytetrafluoroethylene or tetrafluoroethylene-hexa-fluoro-propylene copolymer. Such preferred fluoro-ethylene polymers are more commonly known under the trademark of Teflon® which is manufactured by DuPont of Wilmington, Del. This tube liner may generally have a wall thickness that is within a range of about 0.001 inch to about 0.006 inch, and preferably about 0.003 inch. In one embodiment of this first aspect, the tube liner has a wall thickness of no more than about 0.006 inch.

In one embodiment of the first aspect, a first end of the conduit may be defined by an end of the first tube being joined by a sealant to a corresponding end of the second tube. Another option is to have a first end of the cryogenic conduit defined by an end of the first tube that is co-cured to a corresponding end of the second tube. "Co-curing" generally refers to heating the first and second tubes until the respective composites which make up the first and second tubes at least approach their respective curing points so that the first tube can be joined/fused to the second tube via at least generally compressing the two heated tubes together. The first end may also include an additional piece material that overlays one or both the respective ends of the inner and outer tubes to provide support for the first end. One such additional piece of material may be an "end cap" made of an appropriate material (e.g., silicone rubber-impregnated glass cloth).

Generally, the structural integrity of the cryogenic conduit of this first aspect can be maintained at temperatures of down to about 140 Rankine (−320 degrees Fahrenheit). Further, the structural integrity of the cryogenic conduit of this first aspect can generally be maintained at pressures of up to about 500 pounds per square inch. "Maintaining structural integrity" generally means that the cryogenic conduit maintains the ability to transport cryogenic fluid without losing a significant amount of cryogenic fluid from the confines of the cryogenic conduit due to leakage. In one embodiment of the first aspect, the cryogenic conduit may have a maximum leakage rate of about 0.02 SCFM/ft. length/inch diameter. In other words, the cryogenic conduit of the first aspect may leak by no more than about 0.02 standard cubic feet of the cryogenic material per minute per foot length of the conduit per inch inner diameter of the inner conduit aperture. Another embodiment of the first aspect may have a maximum leakage rate of only about 0.01 SCFM/ft. length/inch diameter.

A second aspect of the present invention is embodied by a cryogenic fluid system that has a cryogenic conduit that includes first and second tubes. At least one of these first and second tubes is formed at least in part from silicone rubber-impregnated glass cloth. A tube liner, which is made from a fluorocarbon polymer, is disposed against a first inner wall of the first tube so that the first tube is disposed between the second tube and the tube liner.

Various refinements exist of the features noted in relation to the subject second aspect of the present invention as well.

Further features may also be incorporated in the subject second aspect of the present invention. These refinements and additional features may exist individually or in any combination. Generally, each of the various features discussed above in relation to the above-described first aspect of the present invention may be utilized by the second aspect of the present invention as well, alone or in any combination.

A third aspect of the present invention is embodied by a method of making a cryogenic fluid system for conducting cryogenic fluid. The method generally includes forming a first tube on a first mandrel of a first diameter, forming a second tube on a second mandrel of a second diameter, larger than the first diameter, and thereafter sliding the first tube relative to the second tube so as to dispose the first tube within the second tube. That is, the first tube may be slid within the interior of the second tube, or the second tube may be slid about the outer periphery of the inner first tube, so as to position the second tube around the exterior of the first tube. The tube-in-tube arrangement of the first and second tubes may generally be referred to as a cryogenic conduit. The method of this third aspect of the present invention generally includes this cryogenic conduit being integrated into the cryogenic fluid system.

The first tube of the third aspect is generally fabricated by forming a first tubular layer of silicone rubber-impregnated glass cloth about the first mandrel, winding a reinforcement cord about the first mandrel after the first tubular layer is formed, and forming a second tubular layer of silicone rubber-impregnated glass cloth about the first mandrel after the reinforcement cord is wound about the first mandrel. In other words, the first mandrel is surrounded by a preferably substantially uniform cover of material defining the first tubular layer. Then the reinforcement cord is coiled around the first mandrel such that the first tubular layer is at least generally positioned between the reinforcement cord and the first mandrel. This is followed by another preferably substantially uniform cover of material defining the second tubular layer such that the reinforcement cord is sandwiched between the first and second tubular layers. Put another way, the reinforcement cord is embedded between the first and second tubular layers of the silicone rubber-impregnated glass cloth. Heat is then applied at least to the first tubular layer and the second tubular layer thus fusing at least part of at least one of the first and second tubular layers to join the first and second tubular layers to one another. The second tube of the cryogenic conduit is generally formed in the same manner as that of the first tube except that the above-mentioned mandrel of a second diameter larger than the first is used to fabricate the second tube. While a "mandrel" should be known to those skilled in the art, in relation to the subject third aspect it generally refers to a bar/rod (generally metal) or other appropriate mount that serves as a core around which conduit precursor material may be wrapped/wound, cast, molded, forged, or otherwise shaped into the resultant conduit.

Various refinements exist of the features noted in relation to the subject third aspect of the present invention as well. Further features may also be incorporated in the subject third aspect of the present invention as well. These refinements and additional features may exist individually or in any combination. For instance, a fluoro-ethylene polymer or copolymer (e.g. Teflon®) can be positioned about the first mandrel prior to forming the first tubular layer of the first tube (e.g., to provide a liner for the cryogenic conduit, and that will interface with a cryogenic fluid that flows through the cryogenic conduit. In one embodiment, a thickness of the fluoro-ethylene polymer or copolymer is within a range of about 0.001 inch up to about 0.006 inch, and in another embodiment is no more than about 0.006 inch. This fluoro-ethylene polymer or copolymer generally may be adhered to the first tubular layer of silicone rubber-impregnated glass cloth, preferably by heating the first tubular layer of silicone rubber-impregnated glass cloth to join at least part of the first tubular layer to the fluoro-ethylene polymer or copolymer via melt-bonding. In another embodiment, an appropriate insulation may be disposed between the first and second tubes. One way to provide this insulation between the first and second tubes may be to apply the insulation around the first tube before installing the first tube inside the second tube. However, other ways of placing insulation between the first and second tubes may be appropriate.

One embodiment of the third aspect can include wrapping or winding an additional reinforcement cord about the mandrel on which the first and/or second tubes are fabricated, after the "outermost" tubular layer of silicone rubber-impregnated glass cord is formed. In other words, the "outermost" tubular layer of silicone rubber-impregnated glass cord for the first and/or second tube can be positioned at least generally between the original reinforcement cord and the additional reinforcement cord. This additional reinforcement cord can be included in the structure of the cryogenic conduit to provide additional structural support for the cryogenic conduit. In other words, this additional reinforcement cord can be included in the structure of the cryogenic conduit for supplemental structural support. Further, this additional reinforcement cord can be made from the same or different reinforcement material as the original cord.

It may be desirable in accordance with the third aspect to provide a joint at one or both ends of the cryogenic conduit. In one embodiment, a first end of the cryogenic conduit can be formed by adhesively joining or co-curing an end of the first tube to a corresponding end of the second tube after sliding the first tube into the second tube. This may be accomplished by clearing the insulation (if any is present) from between the respective ends of the first and second tubes so that the outer wall of the first tube can contact the inner wall of the second tube. A sufficient amount of heat and/or adhesive may then be applied to at least the outer wall of the first tube and/or the inner wall of the second tube so that the first tube and the second tube can be compressed together to bond the first and second tubes together to form an end of the cryogenic conduit.

BRIEF DESCRIPTION OF THE DRAWINGS

FIG. 1 is cross-sectional view of one embodiment of a cryogenic conduit.

FIG. 2 is a magnified cross-sectional view of a portion of the cryogenic conduit of FIG. 1 taken at circle 2.

FIG. 3 is a magnified cross-sectional view of a portion of the cryogenic conduit of FIG. 1 taken at circle 3.

FIG. 4 is a schematic side view of one embodiment of a cryogenic fluid system that includes the cryogenic conduit of FIG. 1.

DETAILED DESCRIPTION

The present invention will now be described in relation to the accompanying drawings, which at least assist in illustrating the various pertinent features thereof. FIGS. 1–3 illustrate one embodiment of a cryogenic conduit 110 which is made up of a first tube 112, a second tube 114, and a tube liner 124. The tube liner 124 is disposed within the first tube 112 (i.e., the first tube 112 is disposed about the tube liner 124), while the first tube 112 is disposed within the second tube 114 (i.e., the second tube 114 is disposed about the first tube 112). The cryogenic conduit 110 extends along and is disposed about a central, first reference axis 126.

Generally, the first tube 112 is defined by an inner wall 116 and an outer wall 118, and is a composite structure in that it has a first layer 113 and a second layer 115. In one embodiment, at least one of the first layer 113 and the second layer 115 of the first tube 112 is a silicone rubber-impregnated glass cloth. "Silicone", as used herein, refers to organosilicon oxide polymers based on the chemical formula —R2Si—O— where R is a monovalent organic radical. Silicone rubber-impregnated glass cloth generally corresponds to a fiber glass-based weave that is coated with silicone rubber. The silicone rubber-coated fiber glass-based weave is generally heated to enable the silicone rubber to penetrate between the glass fibers of the weave. Use of silicone rubber-impregnated glass cloth as a material that makes up at least one of, and more preferably both of, the first layer 113 and the second layer 115 of the first tube 112 enables the cryogenic conduit 110 to realize flexibility previously unavailable in conventional cryogenic conduits. By way of example, silicone rubber-impregnated glass cloth tubing that may be utilized as a component the cryogenic conduit 110 may be made according to SAE (Society of Automotive Engineers) aerospace standards AS1505, AS1542, and/or AS1541. While the first tube 112 is illustrated as being a composite structure (i.e. having multiple layers such as the first and second layers 113, 115), some embodiments of the cryogenic conduit 110 reflect the first tube 112 being a single-layered structure.

The first tube 112 includes an interior reinforcement cord 130 disposed between the first layer 113 and the second layer 115 of the first tube 112. This interior reinforcement cord 130 is positioned between the first and second layers 113, 115 of the first tube 112 in such a manner as to form a protrusion 131 on the outer wall 118 of the first tube 112 in the respective location where the interior reinforcement cord 130 is positioned. However, the inner wall 116 of the first tube 112 is substantially devoid of such a protrusion 131. In one embodiment, the inner wall 116 of the first tube 112 is an at least generally cylindrical surface. In any case, the interior reinforcement cord 130 is arranged in a spiral/helical configuration about the first reference axis 126 (i.e., it is wrapped or wound about the first layer 113). In one embodiment, the interior reinforcement cord 130 is made of steel, glass fiber, or Kevlar® fiber (made by DuPont of Wilmington, Del.), although any material hat effectively remains flexible and/or ductile upon exposure to cryogenic temperatures is generally appropriate for the composition of the interior reinforcement cord 130. Additionally, materials that prevent kinking (i.e. the forming of sharp folds or creases) of the conduit 110, yet allow flexure of the cryogenic conduit 110, are generally desirable for the composition of the interior reinforcement cord 130.

In addition to the interior reinforcement cord 130, the first tube 112 also has first and second exterior reinforcement cords 132, 134, respectively, attached to the outer wall 118 of the first tube 112. As such, the second layer 115 of the first tube 112 is disposed between the interior reinforcement cord 130 and the first and second exterior reinforcement cords 132, 134. These first and second exterior reinforcement cords 132, 134 are longitudinally spaced with the protrusion 131 of the outer wall 118 being disposed between the first and second exterior reinforcement cords 132, 134. Accordingly, the first and second exterior reinforcement cords 132, 134 are substantially parallel with the interior reinforcement cord 130, and thus, spiral about the first reference axis 126. Ideally, the first and second exterior reinforcement cords 132, 134 are made of steel, glass fiber, carbon fiber, or Kevlar® fiber, although any material that remains at least generally pliable upon exposure to cryogenic temperatures is generally appropriate for the composition of the reinforcement cords 132, 134.

Summarily, the first tube 112 of the cryogenic conduit 110 generally has an at least generally annular first layer 113 disposed in interfacing relation with the tube liner 124, the reinforcement wire 130 wrapped about the first layer 113, an at least generally annular second layer 115 disposed about both the reinforcement wire 130 and the first layer 113, and the first and second reinforcement cords 132, 134 disposed about the second layer 115 of the first tube 112. Some embodiments of the cryogenic conduit 110 may change the position and/or number of one or both the inner reinforcement cord(s) (e.g. 130) and the outer reinforcement cord(s) (e.g. 132, 134) as they relate to the first tube 112 of the cryogenic conduit 110. While the first and second reinforcement cords 132, 134 are discussed as having the same composition, some embodiments of the cryogenic conduit 110 have a first outer reinforcement cord 132 which differs in composition from that of the second outer reinforcement cord 134. In addition, some embodiments of the cryogenic conduit 110 may have (or be devoid of) one or more of the inner reinforcement cord 130, the first outer reinforcement cord 132, and the second outer reinforcement cord 134.

The second tube 114 is defined by an inner wall 120 and an outer wall 122, and is illustrated as a composite structure in that the second tube 114 has a first layer 117 and a second layer 119. The composition of the second composite which makes up the second tube 114 can be the same or different than the first composite which makes up the first tube 112. The composition of each of the first and second tubes 112, 114 is generally only limited in that at least one of the first and second tubes 112, 114 preferably at least includes silicone rubber-impregnated glass cloth. Again, "silicone", as used herein, refers to organosilicon oxide polymers based on the chemical formula —R2Si—O— where R is a monovalent organic radical. Silicone rubber-impregnated glass cloth generally corresponds to a fiber glass-based weave that is permeated/infused with silicone rubber. Use of silicone rubber-impregnated glass cloth as a material that makes up the second tube 114 enables the cryogenic conduit 110 to exhibit flexibility previously unavailable in conventional conduits. While the second tube 114 is illustrated as being a multiple-layered composite structure, some variations of the cryogenic conduit 110 have a second tube 114 that is substantially a single layer structure.

As with the first tube 112, the second tube 114 also includes an interior reinforcement cord 136 disposed between the first layer 117 and the second layer 119 of the second tube 114. This interior reinforcement cord 136 is positioned between the first and second layers 117, 119 of the second tube 114 in such a manner as to form a protrusion 137 of the outer wall 122 of the second tube 114 in the respective location where the interior reinforcement cord 136 is positioned. Similar to that of the first tube 112, the inner wall 120 of the second tube 114 also is substantially devoid of such a protrusion 137. In one embodiment, the inner wall 120 of the second tube 114 is an at least generally cylindrical surface. In any case, the interior reinforcement cord 136 is arranged in a spiral/helical configuration about the first reference axis 126, and can be made up of the same or different material as one or more of the reinforcement cords 130, 132, 134 of the first tube 112.

The second tube 114 also has first and second exterior reinforcement cords 138, 140, respectively, attached to the outer wall 122 of the second tube 114. These exterior reinforcement cords 138, 140 are longitudinally spaced with the protrusion 137 of the outer wall 122 being disposed between the first and second exterior reinforcement cords 138, 140. Accordingly, the first and second exterior reinforcement cords 138, 140 are substantially parallel with the interior reinforcement cord 136, and thus, spiral about the first reference axis 126. Accordingly, the second tube 114 is illustrated having an at least generally annular first layer 117, the interior reinforcement cord 136 wrapped about the first layer 117, an at least generally annular second layer 119 disposed about both the reinforcement cord 136 and the first layer 117, and the first and second exterior reinforcement cords 138, 140 disposed about the second layer 119 of the second tube 114. As with the first tube 112, the number, position, and orientation of the interior and exterior reinforcement cord(s) of the second tube 114 may vary depending on the particular embodiment.

The first and second exterior reinforcement cords 138, 140 of the second tube 114 can be made from the same or different material as any of the above-discussed reinforcement cords 130, 132, 134 of the first tube 112. In other words, each reinforcement cord 130, 132, 134, 136, 138, 140 can be made from the same or different material as any other reinforcement cord(s) 130, 132, 134, 136, 138, 140. Preferably, the interior cord(s) (e.g. 130, 136) are made of a different material than the corresponding exterior cord(s) (e.g. 132, 134, 138, 140). The advantage of including two or more reinforcement cords made from different materials in the cryogenic conduit 110 is to optimize strength and/or flexibility as generally desired in the final product.

With regard to both the first tube 112 and the second tube 114, the number of revolutions per inch of the reinforcement cord(s) can vary depending on the desired flexibility of the cryogenic conduit 110. Referring specifically to the first tube 112, $\delta_4$ represents the distance between adjacent coils of a respective reinforcement cord (e.g. 130) along a length $\delta_1$ of the first tube 112. The distance $\delta_4$ between longitudinally spaced (i.e. along the length $\delta_1$ of the cryogenic conduit 110) points of adjacent revolutions of a respective reinforcement cord (e.g. 130) is preferably about 0.25 inch up to about 0.75 inch. Similarly, $\delta_5$ represents the distance between adjacent coils of a respective reinforcement cord (e.g. 136) along the length $\delta_1$ of the second tube 114. The distance $\delta_5$ between longitudinally spaced points of adjacent revolutions of a respective reinforcement cord (e.g. 136) is preferably about 0.25 inch up to about 0.75 inch. In some embodiments, the distance $\delta_5$ may be substantially equal to the distance $\delta_4$. In other embodiments, the distance $\delta_5$ may be substantially less than or greater than the distance $\delta_4$.

An annulus 142 is disposed between the first tube 112 and the second tube 114. In other words, the outer wall 115 of the first tube 112 is spaced from the inner wall 117 of the second tube 114. Insulation 144 is positioned within the annulus 142. Preferred materials for the insulation 144 include cryolite batting, Min-K, ceramic fiber-based insulation, and any other appropriate substance that is capable of preventing or at least generally reducing the passage of heat from the first tube 112 to the second tube 114 (or vice versa). The insulation 144 is generally of the type that enables the cryogenic conduit 110 to maintain flexibility. In other words, the insulation 144 is preferably not of a density which would make the conduit 110 substantially stiff/rigid. In fabricating the cryogenic conduit 110, the insulation 144 is usually placed around the first tube 112, and then the first tube 112 is slid into the second tube 114.

The tube liner 124 is disposed against the inner wall 116 of the first tube 112. Thus, the first tube 112 is generally positioned between the second tube 114 and the tube liner 124. In one embodiment, the tube liner 124 is formed of a fluorocarbon polymer, or more specifically a fluoro-ethylene polymer and/or copolymer, more preferably polytetrafluoroethylene or tetrafluoroethylene-hexa-fluoro-propylene copolymer (e.g., Teflon® manufactured by DuPont of Wilmington, Del.). A fluorocarbon polymer is used to make up the tube liner 124 of the cryogenic conduit because it may provide low temperature ductility while generally maintaining a gas barrier. The tube liner 124 generally has a wall thickness (which is measured perpendicularly to the first reference axis 126) that is within a range of about 0.001 inch up to about 0.006 inch, and preferably about 0.003 inch. It has been discovered that a tube liner 124 made of a fluorocarbon polymer and having a wall thickness of 0.25 inch or greater cracks under exposure to temperatures of only about 395° Rankine (−65° Fahrenheit). By contrast, use of a tube liner 124 made of a fluorocarbon polymer and having a wall thickness substantially thinner than the above-mentioned 0.25 inch provides a tube liner 124 that substantially resists cracking at temperatures down to about (and even below in some instances) 37° Rankine (−423° Fahrenheit). Accordingly, beneficial results are observed by using a fluorocarbon polymer tube liner 124 having a thickness of 0.001 inch up to about 0.006 inch in the cryogenic conduit 110.

The tube liner 124 defines a conduit aperture 128 and accordingly defines an inner diameter $\delta_3$ of the conduit aperture 128 through which cryogenic fluids are conducted and/or transported. The inner diameter (i.e. the distance between opposing sides of the conduit aperture 128) $\delta_3$ of the conduit aperture 128 is about 0.75 inch up to about 6.00 inches in one embodiment. However, diameters outside that range are contemplated, as the size of the diameter $\delta_3$ of the conduit aperture 128 is dependent upon, amongst other factors, a thickness $\tau_1$ of the conduit 110 and the amount of flexibility desired.

The wall thickness $\tau_1$ of the cryogenic conduit 110 can generally be calculated by dividing the difference of the inner diameter $\delta_3$ of the conduit 110 and an outer diameter $\delta_2$ of the conduit 110 by 2, or $\tau_1=(\delta_2-\delta_3)/2$, wherein the outer diameter $\delta_2$ of the cryogenic conduit 110 is generally defined by the outer wall 122 of the second tube 114. In other words, the wall thickness $\tau_1$ of the cryogenic conduit 110 generally corresponds to a distance (which is perpendicular to the length $\delta_1$ of the conduit 110) between the outer wall 122 of the second tube 114 and the inner wall 116 of the first tube 112 of the cryogenic conduit 110. In one embodiment, the thickness $\tau_1$ of the cryogenic conduit 110 is generally about 0.25 inch up to about 0.75 inch. Again however, thicknesses outside that range are contemplated, as the thickness $\tau_1$ of the conduit 110 is dependent upon, amongst other factors, the amount of flexibility desired and the physical/chemical properties (e.g., pressure and/or temperature) of the cryogenic fluids that are to be conducted and/or transported by the cryogenic conduit 110.

The cryogenic conduit 110 is generally made by fabricating the first tube 112 and the tube liner 124 on a first mandrel and fabricating the second tube 114 on a second mandrel having a larger diameter than that of the first mandrel. The tube liner 124 is first fabricated by positioning fluoroethylene polymer or copolymer about the first mandrel. The first layer 113 of the first tube 112 is generally formed around the tube liner 124, and is fabricated by forming a first tubular layer of silicone rubber-impregnated glass cloth about the first mandrel. In other words, the tube liner 124 is coated with silicone rubber-impregnated glass cloth so that the tube liner 124 is positioned between the first mandrel and the first layer 113 of the first tube 112. Then the interior reinforcement cord 130 is wound about the first mandrel so that the first layer 113 is positioned between the first mandrel and the interior reinforcement cord 130. The second layer 115 of the first tube 112 is then fabricated by forming a second tubular layer of silicone rubber-impregnated glass cloth about the first mandrel so that the interior reinforcement cord 130 is positioned between the first and second layers 113, 115 of the first tube 112. Next, first and second exterior reinforcement cords 132, 134 are coiled about the first mandrel so that the second layer 115 of the first tube 112 is positioned between the interior reinforcement cord 130 and the first and second exterior reinforcement cords 132, 134. Heat is then applied at least generally to the first and second layers 113, 115 of the first tube 112 to melt at least portions of the first and second layers 113, 115 of the first tube 112 to join the same. Thus, the interior reinforcement cord 130 is fixedly embedded between the first and second layers 113, 115 of the first tube 112. In addition, this application of heat generally causes the first layer 113 of the first tube 112 to bond to the fluoro-ethylene polymer or copolymer of the tube liner 124 via the melted silicone of the first layer 113 of silicone rubber-impregnated glass cloth functioning as an adhesive. Further, this application of heat generally adheres the second layer 115 of the first tube 112 to the first and second exterior reinforcement cords 132, 134 via the melted silicone of the second layer 115 of silicone rubber-impregnated glass cloth functioning as an adhesive.

The second tube 114 is fabricated either before or after the first tube 112 using a second mandrel having a greater diameter than the first mandrel that is used to fabricate the first tube 112. The second layer 117 of the second tube 114 is generally fabricated by forming a first tubular layer of silicone rubber-impregnated glass cloth about the second mandrel. Then the interior reinforcement cord 136 is wound about the second mandrel so that the first layer 117 of the second tube 114 is positioned between the second mandrel and the interior reinforcement cord 136. The second layer 119 of the second tube 114 is then fabricated by forming a second tubular layer of silicone rubber-impregnated glass cloth about the second mandrel so that the interior reinforcement cord 136 is positioned between the first and second layers 117, 119 of the second tube 114. Next, first and second exterior reinforcement cords 138, 140 are coiled about the second mandrel so that the second layer 119 of the second tube 114 is positioned between the interior reinforcement cord 136 and the first and second exterior reinforcement cords 138, 140. Heat is then applied at least generally to the first and second layers 117, 119 of the second tube 112 to melt at least portions of the first and second layers 117, 119 of the second tube 114 to join the same. Thus, the interior reinforcement cord 136 is fixedly embedded between the first and second layers 117, 119 of the second tube 114. In addition, this application of heat generally adheres the second layer 119 of the second tube 114 to the first and second exterior reinforcement cords 138, 140 via the melted silicone of the second layer 119 of silicone rubber-impregnated glass cloth functioning as an adhesive.

Once the first and second tubes 112, 114 are fabricated, a layer of ceramic fiber-based batting-type insulation 144 is positioned along the inner wall 120 of the second tube 114. The first tube 112 is then directed into the second tube 114 until the second tube 114 houses a significant portion of the first tube 112. Then first and second ends 146, 148, respectively are formed for the cryogenic conduit 110. Accordingly, the distance between first and second ends 146, 148 of the cryogenic conduit 110 defines the length $\delta_1$ of the cryogenic conduit 110.

The first end 146 and the second end 148 are constructed substantially analogously. While the following discussion specifically addresses the first end 146, the second end 148 is constructed and orientated in a like manner to that of the first end 146. The first end 146 is defined by an end 150 of the first tube 112 joined by a sealant to a corresponding end 152 of the second tube 114. The sealant used to join the two ends 150, 152 can be any appropriate sealant such as a room temperature vulcanizing (RTV) silicone adhesive. No insulation exists between the first tube 112 and the second tube 114 at an end length $\delta_6$ of the cryogenic conduit 110. Generally the sealant is positioned up to the entire end length $\delta_6$ of one or both the first tube 112 and the second tube 114 to adhere the first and second tubes 112, 114 together. Instead of using a sealant, some embodiments of the cryogenic conduit 110 co-cure the end 150 of the first tube 112 to the end 152 of the second tube 114 by applying heat to the end length $\delta_6$ of the cryogenic conduit 110 to fuse the first tube 112 to the second tube 114. In other words, an end(s) (e.g. 150 and/or 152) of one or both the first and second tubes 112, 114 is heated to melt the silicone within the respective tube. The first and second tubes 112, 114 are then urged together to allow the melted silicone to act as an adhesive to bond the first tube 112 and the second tube 114 together.

"Flexibility" or "flexible" herein corresponds to the ability of the cryogenic conduit 110 to bend or be bent without damaging the integrity of the conduit 110. Put another way, flexibility of the cryogenic conduit 110 refers to the capacity of the cryogenic conduit 110 to bend or be bent while preventing escape of a significant amount of cryogenic fluid from the conduit aperture 128 of the cryogenic conduit 110 due to cracking or breakdown of the cryogenic conduit 110. Generally, the above-described cryogenic conduit 110, as a whole, reflects a flexibility that corresponds to an inside flexure radius of at least about 0.75 times the diameter $\delta_3$ of the conduit aperture 128. When the conduit 110 is bent/flexed, an overhead view of the conduit 110 generally illustrates that the outer wall 122 of the conduit 110 exhibits two radii. A first of the radii is an outside flexure radius generally being the larger of the two radii, and a second of the radii is an inside flexure radius (also referred to in the art as "inside bend radius") generally referring to the smaller radius of curvature. One embodiment has an inside flexure radius of at least about 1.00 times the diameter $\delta_3$ of the conduit aperture 128. Another embodiment has an inside flexure radius of at least about 1.50 times the diameter $\delta_3$ of the conduit aperture 128. Yet another embodiment may have an inside flexure radius of at least about 2.00 times the diameter $\delta_3$ of the conduit aperture 128. The flexibility provided by the cryogenic conduit 110 may provide a benefit of stretching and/or bending upon steering or moving a component of a flight vehicle such as an engine and/or an exhaust bell. The flexibility provided by the cryogenic conduit 110 may also or alternatively provide a benefit of stretching/bending around other components of the flight vehicle.

In addition, the first and second tubes 112, 114 beneficially reflect substantially noncorrugated designs/configurations along the length $\delta_1$ of the cryogenic conduit 110. In other words, inner walls 116, 120 of the respective first and second tubes 112, 114 are free from exhibiting a wave-type configuration (i.e., wave-type configuration meaning having substantially uniform ridges and troughs) along the entire length $\delta_1$ of the cryogenic conduit 110. Put another way, the inner walls 116, 120 of the respective first and second tubes 112, 114 are generally substantially straight and effectively lack waves/undulations. In some embodiments, one or both the inner walls 116, 120 define at least substantially cylindrical surfaces. Thus, cryogenic fluid can flow through the conduit aperture 128 without experiencing significant impedance to the flow rate experienced in conventional conduits having corrugated inner walls. Additionally, the lack of corrugations along the tube liner 124 (which defines the conduit aperture 128) provides a substantially smooth aperture that enables the cryogenic conduit 110 to be cleaned efficiently.

FIG. 4 illustrates an appropriate use of the cryogenic conduit 110 in a cryogenic fluid system 100 wherein the first end 146 of the cryogenic conduit 110 is fluidly interconnected to a cryogenic fluid source 160, and the second end 148 of the cryogenic conduit 110 is interconnected to a recipient structure 162, so that cryogenic fluid can be conducted/transported from the fluid source 160 to the recipient structure 162.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. A cryogenic fluid system comprising a cryogenic conduit, wherein said cryogenic conduit comprises:
    a first tube comprising a first composite, a first inner wall and a first outer wall;
    a second tube disposed about said first tube, wherein said second tube comprises a second composite, and wherein at least one of said first composite and said second composite comprises silicone rubber-impregnated glass cloth; and
    a tube liner disposed against said first inner wall of said first tube, wherein said first tube is disposed between said second tube and said tube liner, and wherein said tube liner comprises a fluorocarbon polymer.

2. A cryogenic fluid system, as claimed in claim 1, wherein at least one of said first and said second tubes further comprises a reinforcement cord.

3. A cryogenic fluid system, as claimed in claim 2, wherein said reinforcement cord is disposed in at least one of first and second positions, said first position being embedded within said first composite of said first tube and said second position being disposed about said first outer wall of said first tube.

4. A cryogenic fluid system, as claimed in claim 2, wherein said reinforcement cord is disposed in at least one of first and second positions, said first position being embedded within said second composite of said second tube and said second position being disposed about a second outer wall of said second tube.

5. A cryogenic fluid system, as claimed in claim 2, wherein said reinforcement cord is arranged in a helical configuration about a first reference axis, wherein both of said first and second tubes are disposed about said first reference axis and extend along said first reference axis.

6. A cryogenic fluid system, as claimed in claim 2, wherein said reinforcement cord is selected from the group consisting of metal wire, glass fiber-based cord, polymeric cord, and any combination thereof.

7. A cryogenic fluid system, as claimed in claim 1, wherein said first tube comprises an annular first layer of said silicone rubber-impregnated glass cloth disposed in interfacing relation with said tube liner, a first reinforcement cord wrapped about said first layer, an annular second layer of said silicone rubber-impregnated glass cloth disposed about said first reinforcement cord, and a second reinforcement cord disposed about said second layer.

8. A cryogenic fluid system, as claimed in claim 1, wherein said second tube comprises an annular first layer of said silicone rubber-impregnated glass cloth, a first reinforcement cord wrapped about said first layer, an annular second layer of said silicone rubber-impregnated glass cloth disposed about said first reinforcement cord, and a second reinforcement cord disposed about said second layer.

9. A cryogenic fluid system, as claimed in claim 1, wherein said fluorocarbon polymer is selected from the group consisting essentially of fluoro-ethylene-based polymers and copolymers.

10. A cryogenic fluid system, as claimed in claim 1, wherein said fluorocarbon polymer is selected from the group consisting essentially of polytetrafluoroethylene and tetrafluoroethylene-hexa-fluoro-propylene copolymer.

11. A cryogenic fluid system, as claimed in claim 1, wherein said tube liner comprises a wall thickness that is within a range of 0.001 inch up to about 0.006 inch.

12. A cryogenic fluid system, as claimed in claim 1, wherein said tube liner comprises a wall thickness of about 0.003 inch.

13. A cryogenic fluid system, as claimed in claim 1, wherein said tube liner comprises a wall thickness of no more than about 0.006 inch.

14. A cryogenic fluid system, as claimed in claim 1, further comprising an annulus between said first and second tubes.

15. A cryogenic fluid system, as claimed in claim 14, further comprising insulation within said annulus.

16. A cryogenic fluid system, as claimed in claim 15, wherein said insulation is selected from the group consisting of cryolite, Min-K, and ceramic fiber-based insulation.

17. A cryogenic fluid system, as claimed in claim 1, further comprising a first end, wherein said first end of said cryogenic conduit comprises an end of said first tube joined by a sealant to a corresponding end of said second tube.

18. A cryogenic fluid system, as claimed in claim 1, further comprising a first end, wherein said first end of said cryogenic conduit comprises an end of said first tube co-cured to a corresponding end of said second tube, wherein co-curing is defined as chemical bonding between adjacent portions of corresponding tubes.

19. A cryogenic fluid system, as claimed in claim 1, wherein structural integrity of said cryogenic conduit is maintained at temperatures of down to about 140 Rankine (−320 degrees Fahrenheit).

20. A cryogenic fluid system, as claimed in claim 1, wherein structural integrity of said cryogenic conduit is maintained at pressures of up to about 500 pounds per square inch.

21. A cryogenic fluid system, as claimed in claim 1, further comprising a cryogenic fluid source fluidly interconnected with said cryogenic conduit.

22. A cryogenic fluid system comprising a cryogenic conduit, wherein said cryogenic conduit comprises:

a first tube comprising a first inner wall and a first outer wall;

a second tube disposed about said first tube, wherein at least one of said first tube and said second tube comprises silicone rubber-impregnated glass cloth; and a tube liner disposed against said first inner wall of said first tube, wherein said first tube is disposed between said second tube and said tube liner, and wherein said tube liner comprises a fluorocarbon polymer.

23. A cryogenic fluid system, as claimed in claim 22, wherein at least one of said first and said second tubes further comprises a reinforcement cord.

24. A cryogenic fluid system, as claimed in claim 23, wherein said reinforcement cord is arranged in a helical configuration about a first reference axis, wherein both of said first and second tubes are disposed about said first reference axis and extend along said first reference axis.

25. A cryogenic fluid system, as claimed in claim 23, wherein said reinforcement cord is selected from the group consisting of metal wire, glass fiber-based cord, polymer-based cord, and any combination thereof.

26. A cryogenic fluid system, as claimed in claim 22, wherein said fluorocarbon polymer is selected from the group consisting essentially of fluoro-ethylene polymers and copolymers.

27. A cryogenic fluid system, as claimed in claim 22, wherein said fluorocarbon polymer is selected from the group consisting essentially of polytetrafluoroethylene and tetrafluoroethylene-hexa-fluoro-propylene copolymer.

28. A cryogenic fluid system, as claimed in claim 22, wherein said tube liner comprises a wall thickness that is within a range of about 0.001 inch up to 0.006 inch.

29. A cryogenic fluid system, as claimed in claim 22, further comprising an annulus between said first and second tubes.

30. A cryogenic fluid system, as claimed in claim 29, further comprising insulation within said annulus.

31. A cryogenic fluid system, as claimed in claim 22, further comprising a first end, wherein said first end of said cryogenic conduit comprises an end of said first tube which is either joined by a sealant to a corresponding end of said second tube or co-cured to a corresponding end of said second tube, wherein co-curing is defined as chemical bonding between physically adjacent portions of corresponding tubes.

32. A cryogenic fluid system, as claimed in claim 22, wherein said tube liner is in directly interfaces with cryogenic fluid within said cryogenic conduit.

* * * * *